US011984248B2

(12) United States Patent
Cornelius et al.

(10) Patent No.: US 11,984,248 B2
(45) Date of Patent: May 14, 2024

(54) TRANSFORMER FOR USE IN A RAIL VEHICLE

(71) Applicant: HITACHI ENERGY LTD, Zürich (CH)

(72) Inventors: Frank Cornelius, Brilon (DE); Wolfgang Mönig, Brilon (DE)

(73) Assignee: HITACHI ENERGY LTD, Zürich (CH)

( * ) Notice: Subject to any disclaimer, the term of this patent is extended or adjusted under 35 U.S.C. 154(b) by 905 days.

(21) Appl. No.: 16/762,608

(22) PCT Filed: Nov. 7, 2018

(86) PCT No.: PCT/EP2018/080465
§ 371 (c)(1),
(2) Date: May 8, 2020

(87) PCT Pub. No.: WO2019/092014
PCT Pub. Date: May 16, 2019

(65) Prior Publication Data

US 2020/0357561 A1 Nov. 12, 2020

(30) Foreign Application Priority Data

Nov. 10, 2017 (DE) ......................... 102017126473.6

(51) Int. Cl.
*H01F 27/24* (2006.01)
*H01F 27/245* (2006.01)
*H01F 41/02* (2006.01)

(52) U.S. Cl.
CPC ....... *H01F 27/245* (2013.01); *H01F 41/0233* (2013.01)

(58) Field of Classification Search
CPC .... H01F 27/245; H01F 41/0233; H01F 30/10; H01F 37/00; H01F 27/00–40
See application file for complete search history.

(56) References Cited

U.S. PATENT DOCUMENTS 6,407,655 B1 * 6/2002 Kitamura ............ H01F 41/0213 336/213
6,531,946 B2 * 3/2003 Abe ........................ H01F 27/25 29/605

(Continued)

FOREIGN PATENT DOCUMENTS

CN 101271755 A 9/2008
CN 201174297 Y 12/2008

(Continued)

OTHER PUBLICATIONS

Chinese First Office Action dated Apr. 26, 2021 for Chinese Patent Application No. 2018800724014, 7 pages.

(Continued)

*Primary Examiner* — Tuyen T Nguyen
(74) *Attorney, Agent, or Firm* — Sage Patent Group

(57) ABSTRACT

A transformer for use in a rail vehicle and/or for rail applications, including a core which is at least partially surrounded by at least one coil is, with regard to the objective of providing a transformer in which the geometry of a coil can be selected to be as variable as possible, characterized in that the core is produced from individual segments, wherein the total cross-sectional surface-area of the core is greater than or equal to the sum of the individual cross-sectional surface-areas of the segments and wherein at least two individual cross-sectional surface-areas differ from each other and/or from the total cross-sectional surface-area in terms of their size and/or geometric shape.

20 Claims, 4 Drawing Sheets

(56) References Cited

U.S. PATENT DOCUMENTS

| | | | | |
|---|---|---|---|---|
| 8,653,924 | B2 | 2/2014 | Kobayashi et al. | |
| 9,460,842 | B2 | 10/2016 | Inaba | |
| 2007/0261231 | A1 | 11/2007 | Bosley et al. | |
| 2007/0262839 | A1* | 11/2007 | Bosley .................. | H01F 27/255<br>335/297 |
| 2015/0170821 | A1 | 6/2015 | Cornelius et al. | |
| 2016/0104567 | A1 | 4/2016 | Doljack | |

FOREIGN PATENT DOCUMENTS

| | | | | |
|---|---|---|---|---|
| CN | 101427329 | A | 5/2009 | |
| CN | 104603891 | A | 5/2015 | |
| DE | 102011086940 | A1 | 6/2012 | |
| DE | 112012004738 | T5 | 7/2014 | |
| DE | 102014223797 | A1 | 5/2016 | |
| JP | 2007013042 | A | 1/2007 | |
| WO | WO-0243085 | A1 * | 5/2002 | ........... H01F 27/322 |
| WO | 2007133399 | A2 | 11/2007 | |
| WO | WO-2009053534 | A1 * | 4/2009 | ........... H01F 27/263 |

OTHER PUBLICATIONS

International Search Report and Written Opinion of the International Searching Authority, PCT/EP2018/080465, dated Mar. 20, 2019, 13 pages.

Chinese Third Office Action dated Sep. 15, 2022, for Chinese Patent Application No. 201880072401.4, 6 pages (including English summary).

* cited by examiner

TRANSFORMER FOR USE IN A RAIL VEHICLE

CROSS REFERENCE TO RELATED APPLICATIONS

This application is a 35 U.S.C. § 371 national stage application of PCT International Application No. PCT/EP2018/080465 filed on Nov. 7, 2018, which in turn claims foreign priority to German Patent Application No. 102017126473.6, filed on Nov. 10, 2017, the disclosures and content of which are incorporated by reference herein in their entirety.

BACKGROUND

Embodiments of the disclosure relate to a transformer for use in a rail vehicle and/or for rail applications, comprising a core which is at least partially surrounded by at least one coil.

In conventional traction transformers, a core is generally used and is composed of a plurality of sheet bundles. In this instance, a plurality of butt joints and connection locations are produced. If four sheet bundles are used, four butt joints and connection locations usually occur. The core sheets used to produce the core are stacked to form bundles and constructed to be fitted one in the other.

Against this background, the geometry of a coil is predetermined by the geometry of the winding member. A round winding member leads to a substantially round coil, an angular winding member leads to a rather angular coil. In traction transformers which can be conventionally obtained, rather round or approximately rectangular geometries usually occur, wherein the respective geometry is closely linked to the production method used in each case. In specific applications, however, a rather round or approximately rectangular geometry may be disadvantageous.

SUMMARY

An object of the disclosure is therefore to provide a transformer in which the geometry of a coil can be selected to be as variable as possible.

According to the disclosure, the above object is achieved with a transformer having the features of patent claim 1.

Accordingly, the transformer mentioned in the introduction is characterized in that the core is produced from individual segments, wherein the total cross-sectional surface-area of the core is greater than or equal to the sum of the individual cross-sectional surface-areas of the segments and wherein at least two individual cross-sectional surface-areas differ from each other and/or from the total cross-sectional surface-area in terms of their size and/or geometric shape.

According to the disclosure, it has first been recognized that specific demands may be placed on a transformer for rail applications, that is to say, demands in terms of the weight, the mechanical properties and the geometry of the housing thereof.

Furthermore, it has been recognized that these demands can substantially be complied with when the core of the transformer is configured in a suitable manner with respect to the weight, the mechanical properties and the geometry thereof.

It has also been recognized that it may be advantageous to use a particular core for transformers for rail applications since generally cores which are also used in transformers in industrial installations are usually used for this.

According to the disclosure, it has finally been recognized that, by means of a modification of the total cross-sectional surface-area of the core, both the coils and the housing can be readily modified and adapted to rail applications. The geometries of the coil cross-sectional surface-areas can be readily adapted to the geometry of the housing. The structure of the transformer can thereby be more compact than before. With a more compact transformer, greater voltage and power ranges can be covered.

In some embodiments, the segments may be configured as core sheet bundles. A core may thus be produced in conventional manner. Core sheet bundles with different but also identical cross-sectional surface-areas can be used in order to configure the total cross-sectional surface-area of the core in the manner of a puzzle or mosaic. Total cross-sectional surface-areas which deviate from regular rectangular surface-areas or square surface-areas and have protuberances or indentations can thus be produced.

Against this background, an individual cross-sectional surface-area may have the geometry of a square, a rectangle, a trapezium, a circle segment or another geometric surface-area with at least one straight side. Such segments can be placed particularly well with the straight sides thereof against other segments with straight sides.

According to another embodiment of the disclosure, an individual cross-sectional surface-area has the geometry of a circle, an ellipse, an oval or another geometric surface-area having a curved border. Total cross-sectional surface-areas of a core can thereby be produced with protuberances or rounded portions.

According to some embodiments, a coil cross-sectional surface-area may have, in addition to round regions in which the winding is subjected to a change of direction, at least one oblique side which is inclined relative to at least two parallel sides. A coil can thereby be arranged below a slope, in particular a roof slope of a rail vehicle.

According to some embodiments, a housing may surround the core and at least two coils. The coils and the core are thus secured against access.

According to another embodiment of the disclosure, the housing has a housing cross-sectional surface-area which is at least partially configured in a trapezoidal manner. The housing can thereby be fitted in a rail vehicle or a rail profile.

In some embodiments, a rail vehicle comprises a transformer of the type described here. A more compact and powerful transformer can thus be used in rail applications.

The transformer may be configured as a traction transformer.

DETAILED DESCRIPTION

Figure 1:
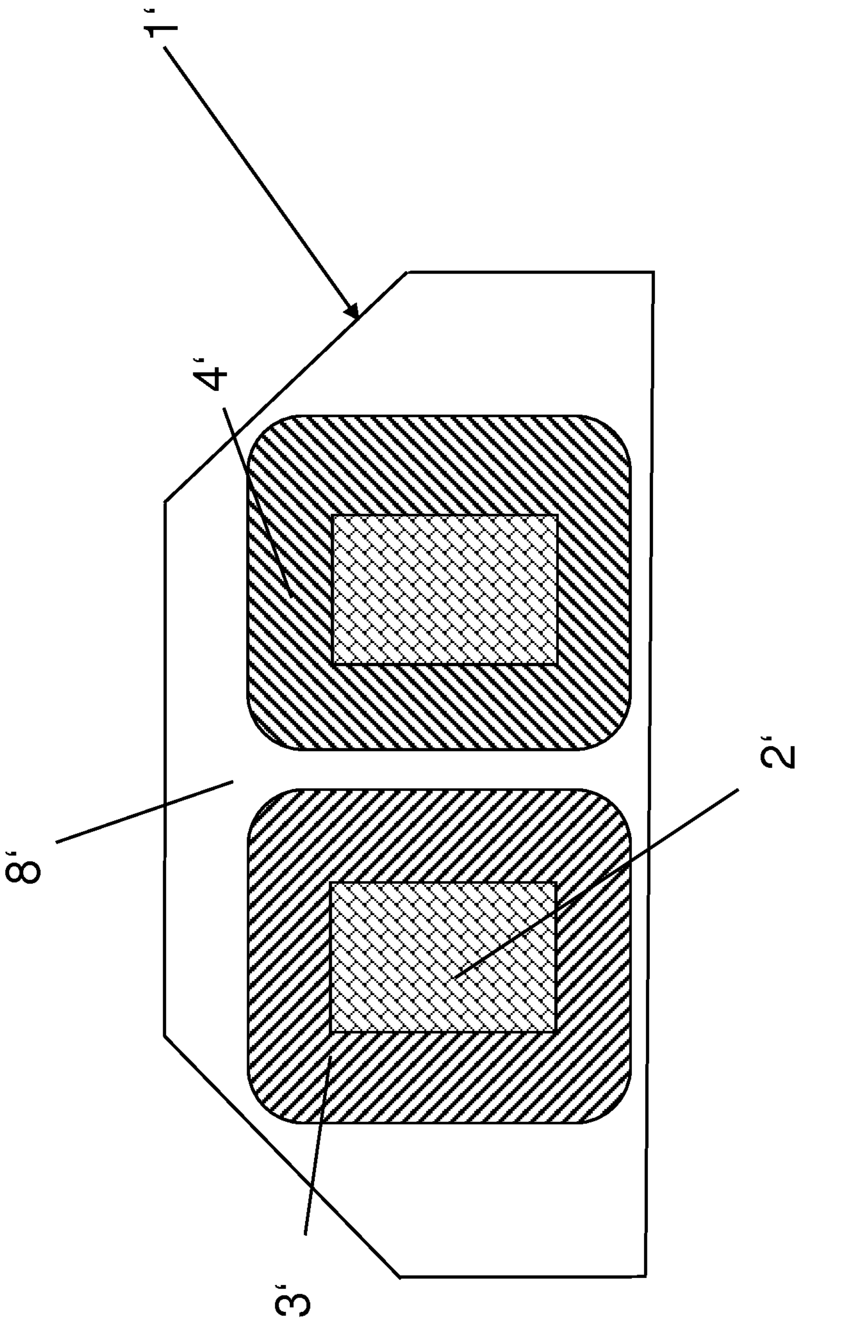
FIG. 1 is a sectioned view of a conventionally produced transformer for rail applications having two coils, the core of which in each case has a rectangular total cross-sectional surface-area, wherein the coils have a substantially rectangular coil cross-sectional surface-area and wherein the corner regions of the coil cross-sectional surface-areas are constructed as round regions.

FIG. 1 shows a transformer, the external dimensions of which are predetermined by a rail profile.

Figure 2:
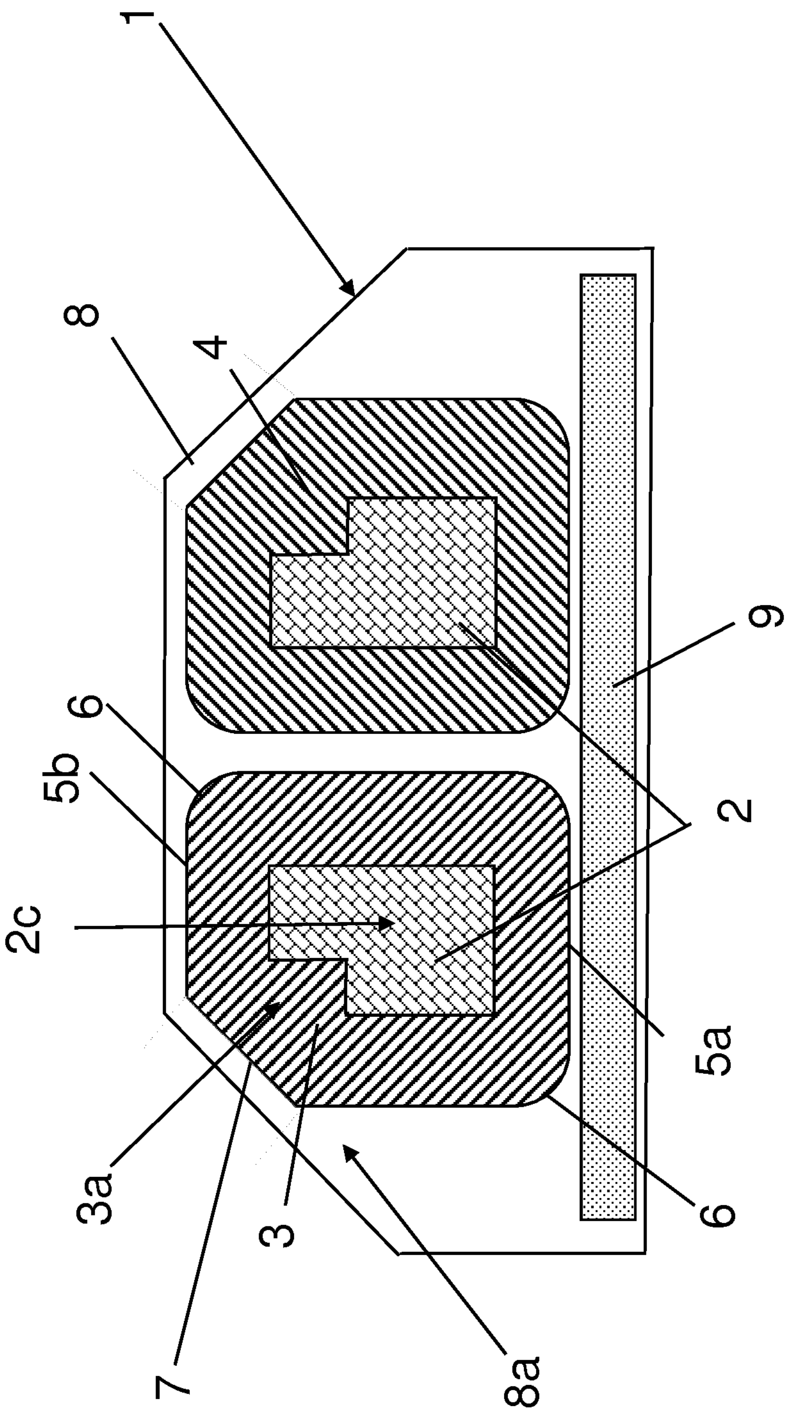
FIG. 2 shows a transformer, wherein the geometries of the coil cross-sectional surface-areas of the coils thereof are adapted to the dimensions of a rail profile.

FIG. 2 shows a transformer 1 for use in a rail vehicle and/or for rail applications, comprising a core 2 which is at least partially surrounded by at least one coil 3.

The core 2 is produced from individual segments, wherein the total cross-sectional surface-area 2*c* of the core is greater than the sum of the individual cross-sectional surface-areas 2*a*, 2*b* of the segments.

Figure 3:
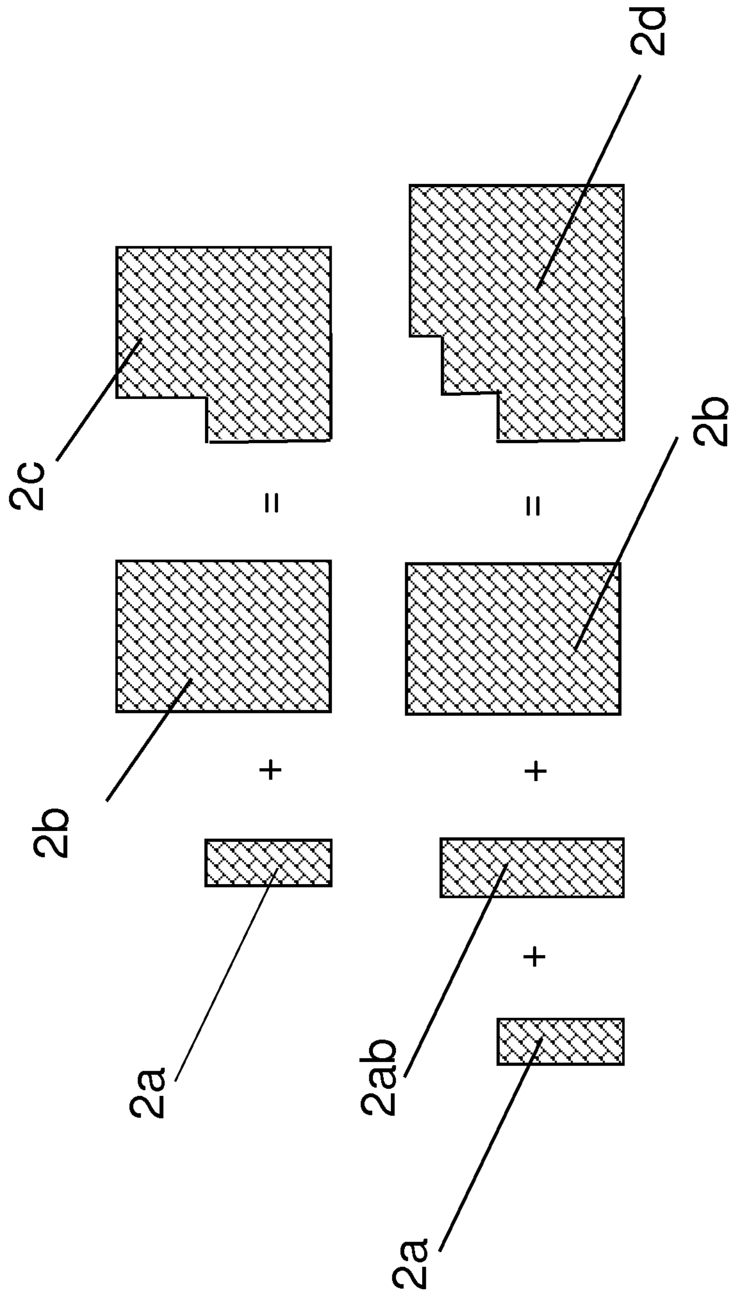
FIG. 3 is a schematic sectioned view of core sheet bundles, wherein, for example, two total cross-sectional surface-areas of cores are produced by adding or combining core sheet bundles with different individual cross-sectional surface-areas or dimensions.

These segments are illustrated with regard to their individual cross-sectional surface-areas 2*a*, 2*b* in the upper portion of FIG. 3.

The two individual cross-sectional surface-areas 2*a*, 2*b* differ from each other in terms of their size, thus deviate from each other in terms of their size. The surface-areas thereof are of different sizes.

The two individual cross-sectional surface-areas 2*a*, 2*b* also differ from each other in terms of their geometric shape and therefore also deviate from each other in terms of their geometry. Although both individual cross-sectional surface-areas 2*a*, 2*b* each have the geometry of a rectangle, the sides of the two rectangles illustrated have different length relationships. On the left, a more elongate rectangle is illustrated, on the right a more compact rectangle is illustrated.

The two individual cross-sectional surface-areas 2*a*, 2*b* also differ in terms of their geometric shape from the total cross-sectional surface-area 2*c* which is hexagonal, has a stepped indentation and is not constructed as a rectangle.

The segments are configured as core sheet bundles. These form the core 2.

FIG. 3 shows that three individual cross-sectional surface-areas 2*a*, 2*b*, 2*ab* each have the geometry of a rectangle.

FIG. 2 shows that a coil cross-sectional surface-area 3*a*, in addition to three round regions 6, in which the winding has a change of direction through 90°, has at least one oblique side 7 which is inclined relative to at least two parallel sides 5*a*, 5*b*.

A housing 8 surrounds the core 2 and at least two coils 3, 4 which surround the core 2. The housing 8 has a housing cross-sectional surface-area 8*a* which is configured partially, that is to say, in the upper portion of the housing 8 in a trapezoidal manner.

In the lower portion of the housing 8, there is schematically illustrated a useful space 9 which can be obtained as a result of the configuration of the core 2 according to FIG. 2 compared with the configuration of the prior art.

Two, three or more than three segments can be used to construct the core 2. The segments may be connected to each other in conventional manner.

The total cross-sectional surface-area 2*c* and the individual cross-sectional surface-areas 2*a*, 2*b* are orientated orthogonally relative to the direction of the magnetic flux through the core 2 and/or to the longitudinal axis of a coil 3,4.

A rail vehicle which is not shown comprises the transformer 1.

Figure 4:
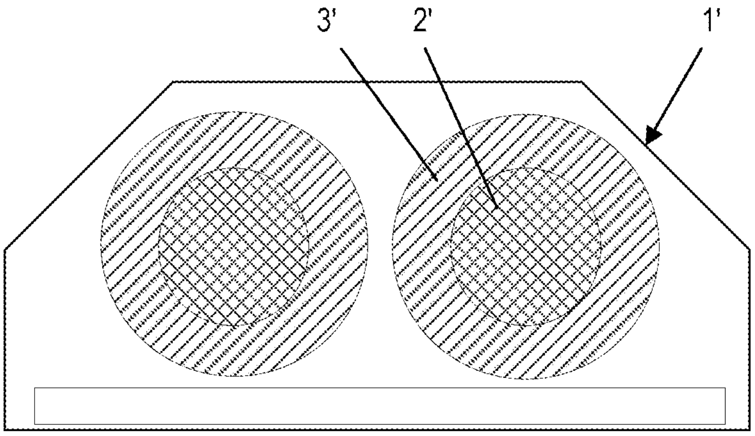
FIG. 4 shows a transformer.

FIG. 4 shows a transformer 1' for use in a rail vehicle and/or for rail applications, comprising a core 2' having an individual cross-sectional surface-area having a circular shape, which is at least partially surrounded by at least one coil 3'.

Figure 5:
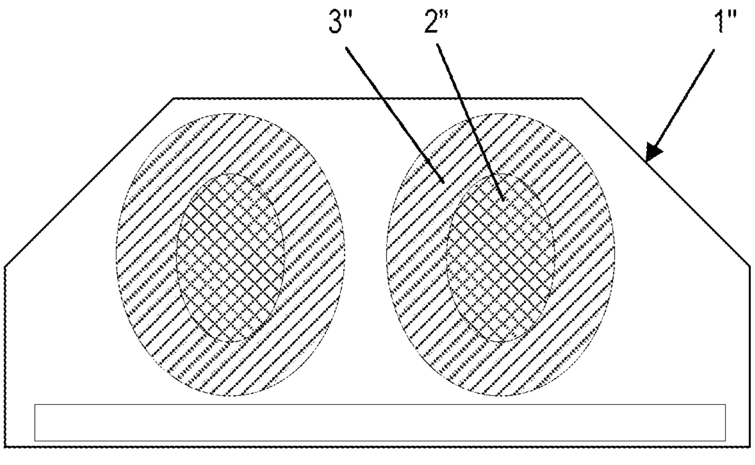
FIG. 5 shows a transformer.

FIG. 5 shows a transformer 1" for use in a rail vehicle and/or for rail applications, comprising a core 2" having an individual cross-sectional surface-area having an elliptical shape, which is at least partially surrounded by at least one coil 3".

LIST OF REFERENCE NUMERALS

1, 1', 1" Transformer
2, 2', 2; Core of 1, 1', 1"
2*a* Individual cross-sectional surface-area
2*b* Individual cross-sectional surface-area
2*ab* Individual cross-sectional surface-area
2*c* Total cross-sectional surface-area
2*d* Total cross-sectional surface-area
3, 3', 3" Coil
3*a* Coil cross-sectional surface-area
4 Additional coil
5*a* Lower parallel side of 3*a*
5*b* Upper parallel side of 3*a*
6 Round region of 3*a*
7 Oblique side of 3*a*
8, 8' Housing
8*a* Housing cross-sectional surface-area
9 Useful space

The invention claimed is:

1. A transformer for use in a rail vehicle, comprising:

a core comprising a plurality of individual segments, each segment comprising an individual cross-sectional surface-area having a shape and a size; and a plurality of coils, each segment at least partially surrounded by a coil of the plurality of coils, a total cross-sectional surface-area of the core being greater than or equal to a sum of the sizes of the individual cross-sectional surface-areas of the segments, and at least two of the individual cross-sectional surface-areas differing in at least one of size and shape from each other.

2. The transformer as claimed in claim 1, wherein the segments are configured as core sheet bundles.

3. The transformer as claimed in claim 1 wherein the shape of at least one of the individual cross-sectional surface areas-has at least one straight side.

4. The transformer as claimed in claim 1, wherein the shape of at least one of the individual cross-sectional surface-areas-has at least one curved side.

5. The transformer as claimed in claim 1, wherein each coil comprises a coil cross-sectional surface-area having a shape and a size, wherein the shape of each coil cross-sectional surface-area comprises:

at least two parallel sides;

at least one curved side in which the winding is subjected to a change of direction; and at least one oblique straight side which is inclined at a non-perpendicular angle relative to the at least two parallel sides.

6. The transformer as claimed in claim 1, further comprising a housing that surrounds the core and at least two coils of the plurality of coils.

7. The transformer as claimed in claim 1, wherein the housing has a housing cross-sectional surface-area having a shape comprising:

a first side;
a second side that is parallel to the first side;
a third side that is not parallel to the first side and not parallel to the second side; and
a fourth side that is not parallel to the first side, not parallel to the second side, and not parallel to the third side.

8. A rail vehicle comprising the transformer of claim 1.

9. The transformer as claimed in claim 1, wherein the at least two of the individual cross-sectional surface-areas differ in size from each other.

10. The transformer as claimed in claim 1, wherein the at least two of the individual cross-sectional surface-areas differ in shape from each other.

11. The transformer as claimed in claim 3, wherein the shape with the at least one straight side comprises one of a square, a rectangle, a trapezium, or a circle segment.

12. The transformer as claimed in claim 4, wherein the shape having the at least one curved side comprises one of a circle, an ellipse, or an oval.

13. A core for a transformer for a rail vehicle, comprising:
a plurality of core segments, each core segment of the plurality of core segments configured to be at least partially surrounded by at least one coil, each core segment has an individual cross-sectional surface area comprising a shape and a size,
at least one of the shapes and the sizes of the individual cross-sectional surface areas of at least two of the core segments being different from each other,
wherein the core has a total cross-sectional surface area size, and
a sum of the sizes of the individual cross-sectional surface areas of the core segments being equal to or less than the total cross-sectional surface area size of the core.

14. The transformer as claimed in claim 1, wherein the individual cross-sectional surface areas of at least two of the core segments have different sizes.

15. The transformer as claimed in claim 1, wherein the individual cross-sectional surface areas of at least two of the core segments have different shapes.

16. The core as claimed in claim 13, wherein each core segment includes a core sheet bundle.

17. The core as claimed in claim 13, wherein the shape of at least one of the individual cross-sectional surface areas has at least one straight side.

18. The core as claimed in claim 17, wherein the shape with the at least one straight side comprises one of a square, a rectangle, a trapezium, or a circle segment.

19. The core as claimed in claim 13, wherein the shape of at least one of the individual cross-sectional surface areas has at least one curved side.

20. The core as claimed in claim 19, wherein the shape with the at least one curved side comprises one of a circle, an ellipse, or an oval.

* * * * *